(12) United States Patent
Wilfer et al.

(10) Patent No.: US 8,080,268 B2
(45) Date of Patent: Dec. 20, 2011

(54) SMOKE AND STEAM-PERMEABLE FOOD CASING COMPRISING A FLAVORED INTERIOR SURFACE

(75) Inventors: Robert Wilfer, Versmold (DE); Ulrich Delius, Frankfurt (DE); Jörg Becker, Preetz (DE); Günther Schetter, Wiesbaden (DE); Martina König, Wiesbaden (DE); Gabriele Kiene, Gau-Weinheim (DE); Cathrin Schulz, Bischofsheim (DE); Dirk Auf Der Heide, Alfhausen (DE); Christian Auf Der Heide, Osnabrück (DE)

(73) Assignee: Kalle GmbH & Co. KG, Wiesbaden (DE)

( * ) Notice: Subject to any disclaimer, the term of this patent is extended or adjusted under 35 U.S.C. 154(b) by 756 days.

(21) Appl. No.: 10/563,256

(22) PCT Filed: Jul. 7, 2004

(86) PCT No.: PCT/EP2004/007408
§ 371 (c)(1),
(2), (4) Date: Jan. 4, 2006

(87) PCT Pub. No.: WO2005/002848
PCT Pub. Date: Jan. 13, 2005

(65) Prior Publication Data
US 2006/0188615 A1   Aug. 24, 2006

(30) Foreign Application Priority Data
Jul. 7, 2003   (DE) .................................. 103 30 762

(51) Int. Cl.
A21D 13/00   (2006.01)

(52) U.S. Cl. ..................... 426/105; 138/118.1; 426/132; 426/135; 426/138; 426/140; 428/34.1; 428/34.3; 428/34.8

(58) Field of Classification Search ................ 138/118.1; 426/105, 132, 135, 138, 140; 428/34.1, 34.3, 428/34.8
See application file for complete search history.

(56) References Cited

U.S. PATENT DOCUMENTS

| 4,442,868 | A | * | 4/1984 | Smith et al. ................. 138/118.1 |
| 4,528,225 | A | * | 7/1985 | Hutschenreuter et al. .. 138/118.1 |
| 5,399,427 | A | | 3/1995 | Stenger et al. |
| 5,501,886 | A | * | 3/1996 | Hammer et al. ............. 428/34.8 |
| 6,231,970 | B1 | * | 5/2001 | Andersen et al. ............. 428/332 |
| 6,294,263 | B1 | * | 9/2001 | Okudaira et al. .......... 428/474.4 |
| 6,660,315 | B2 | | 12/2003 | Miller et al. |
| 2002/0065364 | A1 | * | 5/2002 | Delius et al. .................... 525/66 |
| 2003/0059502 | A1 | | 3/2003 | Warkentin et al. |
| 2004/0062889 | A1 | | 4/2004 | Borodaev et al. |
| 2006/0051466 | A1 | | 3/2006 | Delius et al. |

FOREIGN PATENT DOCUMENTS

| DE | 19608001 | 9/1997 |
| DE | 19846305 | 4/2000 |
| DE | 10124581 | 11/2002 |
| DE | 10302960 | 8/2004 |
| DE | 10320327 | 12/2004 |
| EP | 0139888 | 5/1985 |
| EP | 0217069 | 4/1987 |
| EP | 0473091 | 3/1992 |
| EP | 05500833 | 7/1993 |
| EP | 1125504 | 8/2001 |
| JP | 139401/2000 | 5/2000 |
| WO | WO 97/36798 | 10/1997 |
| WO | WO 98/31731 | 7/1998 |
| WO | WO 02/078455 | 10/2002 |

OTHER PUBLICATIONS

Basic Sausage making process, Feb. 2003, http://web.archive.org/web/20030209224419/http://3men.com/makesaus.htm.*

* cited by examiner

*Primary Examiner* — Brent O'Hern
(74) *Attorney, Agent, or Firm* — Baker Donelson Bearman Caldwell & Berkowitz, PC

(57) ABSTRACT

The present invention relates to a smoke and water-vapor-permeable food casing based on aliphatic polyamide and/or aliphatic copolyamide, which is impregnated with liquid smoke on the food-facing side.

21 Claims, No Drawings

SMOKE AND STEAM-PERMEABLE FOOD CASING COMPRISING A FLAVORED INTERIOR SURFACE

CROSS REFERENCE TO RELATED APPLICATIONS

This is a §371 national stage application of International Application No. PCT/EP04/007408 filed Jul. 7, 2004 which claims priority to German Application No. 10330762.1 filed Jul. 7, 2003.

BACKGROUND OF THE INVENTION

1. Field of the Invention

The present invention relates to a smoke- and water-vapor-permeable food casing based on aliphatic polyamide and/or aliphatic copolyamide.

2. Description of Related Art

In the industrial and craft production of cold-, warm- or hot-smoked raw sausages, scalded-emulsion sausages and cooked-meat sausages, and also processed and fresh cheeses, cellulose casings, cellulose fiber casings and collagen casings and also single-layer or multilayer, water-vapor-permeable plastic casings based on polyamide and in combination with other plastics have proved useful.

In particular in the case of raw sausages, the use of water-vapor-permeable casings is indicated in order to make possible a drying process during ripening to decrease the content of free water in the sausage mix. The water loss can be 0.5% to 50%, based on the starting weight of the sausage. In Salami ripening, for example a weight loss of about 23 to 26% after 10 ripening days is customary, which assumes high-permeability casings. Furthermore, customary plastic casings do not allow cold smoke through (this has a temperature of about 20 to 35° C.) and only small amounts of hot smoke (approximately 70 to 80° C.). However, cold smoking with raw sausage varieties is a standard method. The smoking process, depending on the method, can take from 20 min to several days.

During the smoking, either the smoke generated within a closed chamber (smoking chamber), or the smoke introduced into this chamber is brought to the suspended sausage, or circulated over the goods to be smoked. Alternatively to this, a liquid smoke solution can be nebulized within the chamber.

To achieve a uniformly good smoking result, the sausages must be suspended so that they are accessible to the smoke from all sides. To achieve a uniform smoked color and smoked aroma, the sausages must not touch and also cannot be smoked lying down. It is typical in this case that sausages or sausage links are brought into the smoking chambers in mobile racks hanging on smoke skewers. The sausage hangs here on its own holding loop mounted in the closure clip.

Suspension on the smoke skewers is performed manually or mechanically. The smoke skewers themselves can only be hung up manually in the smoke carts. After the smoking process, the sausage is cleaned from adhering soot particles and dried. Owing to a high drying shrinkage, however, oil can escape at the clip, so that the sausage is coated with a fat film. This has long been considered as a disadvantage and hygiene risk by the meat-processing industry.

After the drying phase, the smoke skewers are taken out of the smoke cart and the sausage is taken off from the smoke skewers. The sausage links are cut into individual sausages and then packed, the suspension loops having to be removed before packaging.

Smoking is generally very labor-intensive and increases the production costs. The operation of smoking chambers is subject to supervision by law with the focus on emission protection and fire precautions. Smoking chambers and the tools used for smoking (smoke carts and smoke skewers) must be regularly cleaned using chemical cleaning agents, with high labor requirements and high personal use, and maintained. Alternatives to simplify the smoking process with the elimination of smoking chambers are still being sought.

To transfer smoke flavor and aroma to sausage products, in addition to the methods of traditional smoking and smoking using liquid smoke, there is the possibility of directly impregnating sausage casings with liquid smoke. In the prior art, smoke- and water-vapor-permeable polymer casings are alternatively described which are smokeable, or smoke- and water-vapor-impermeable polymer casings which can be impregnated with liquid smoke.

Casings for unsmoked sausage products are currently produced to a great extent from thermoplastics. Conventional plastics are polyamides, polyesters and vinyl chloride copolymers. The casings can be produced as a single layer or multilayered. In the multilayered casings, frequently, layers of polyolefin are also present. The critical advantage of these casings is the technically relatively simple and inexpensive production. Casings made of thermoplastic generally have water vapor transmission rate (WVTR) of about 3 to 20 g/m² d. Sausage products in such a casing loose markedly less weight during storage. Such casings, for instance made of polyamide, are generally not smoke-permeable, and can therefore not be used for producing sausage varieties which are smoked.

It is further known to coat or impregnate tubular food casings, especially sausage casings, on the outside or inside with liquid smoke. Coatings on the outside are simpler to carry out technically. The constituents of the liquid smoke must then migrate through the casing, however, in order to give the emulsion the typical color, aroma and flavor of smoked goods. Cellulose casings impregnated from the outside with liquid smoke are frequently described. Casings made of a different material are frequently not permeable enough for this. This applies for single-layer plastic casings, but very particularly for multilayered plastic casings. These can at any rate be treated with liquid smoke on the inside, which, however, regularly fails because the liquid smoke does not adhere sufficiently and collects to form drops before it is dried. An approach to a solution of this problem is described in DE-A 196 08 001. It consists of applying the liquid smoke to an appropriately cut to size flat film which is then formed into a tube in such a manner that the side coated with liquid smoke faces inward. The tube is then permanently sealed by hot sealing, as a result of which it acquires a longitudinal seam. The liquid smoke is applied, and the tube produced, virtually directly before stuffing with sausage emulsion. Thus shirring the sealed tube is unnecessary. The method, however, requires technically complex, and correspondingly expensive, apparatuses.

WO 97/36798 describes a hot-shrinking planar or tubular food casing which contains on the interior a layer of a copolymer and a food additive. The copolymer contains substantially water-insoluble and hygroscopic segments. As food additive, liquid smoke is also disclosed which is transferred from the casing to its contents. However, it has proved to be a problem that the interior sides stick to one another. This is particularly the case when the casing is stored for a relatively long time in rolled-up or shirred stick form.

A very similar shrink film is also disclosed in WO 98/31731. Here, the interior coating consists of a mixture having (i) an additive which is a flavorant, an odorant, a colorant, an antimicrobial agent, a chelating agent and/or an odor-absorbent, (ii) a polysaccharide or protein as binder and (iii) a crosslinker which has at least two carbonyl groups. The additive can be, inter alia, liquid smoke. Tubular films coated on the interior are produced in this case from the corresponding flat films. The coating itself is performed using a roller. In this case the edges are not coated. The flat film is then formed into a tube and the edges of the film which are laid one above the other are firmly bonded by hot sealing. The resultant casing is shirred and closed at one end with a clip. The casing is then stuffed with a meat product and heated. The additive present in the interior layer of the casing is transferred in the course of this to the meat product. However, the interior sides of the casing frequently stick to one another after shirring, so that on deshirring the interior layer is damaged.

JP-A 139401/2000 describes a film by which a food coloring may be applied to sausage emulsion, ham or similar foods. This is achieved using a coating which, in addition to the food dye, also contains an edible plasticizer such as glycerol, sorbitol or propylene glycol.

EP-A 139 888 discloses a method for smoking foods in a casing made of aliphatic polyamide. The polyamide takes up at least 3% by weight, preferably at least 5% by weight, of water. Smoking is therefore performed in the presence of water or water vapor which requires a climatically controlled smoke chamber.

DE-A 198 46 305 relates to a barrier casing made of a plastic material which has on the inside a layer made of a sorbent material (woven fabric, knits), which is impregnated with colorants or flavorants. During boiling or scalding, the colorants or flavorants are transferred to the casing-enclosed food. The internal layer of the casing is generally bonded to the adjacent layer of the casing by a glue. The barrier casing itself consists, for example, of polyamide and polyethylene layers. Tubular casings are generally produced from corresponding flat films by hot-sealing or gluing. In the region of the sealing seam, the colorant or flavorant is frequently transferred nonuniformly. Sealed or glued casings frequently also display an uneven shrinkage. Then, after scalding or boiling of the sausage, in the seam regions, an unwanted jelly deposit is found between casing and sausage emulsion.

A multilayer plastic casing impregnated on the inside with a mixture of liquid smoke and a browning agent is described in DE-A 101 24 581. It comprises one aliphatic polyamide-based layer in each case on the interior and exterior, and also a central water-vapor-barrier, if appropriate, also oxygen-barrier, layer. This middle barrier layer consists, for example, of polyethylene or ethylene/vinyl alcohol copolymer. The liquid smoke mixture is to act for at least 5 days on the interior before the casing is soaked and stuffed.

All known casings having an interior layer or interior coating which contains a transferrable food additive have the disadvantage that the adhesion of the layer cannot be set in any desired manner. The consequence of insufficient adhesion is that the sausage has a tendency to gel formation and that the coating, on final processing (in the case of tubular films customarily by shirring and/or inverting) displays cracks or even bursts. The casing is then no longer usable. In the event of excessive adhesion, colorants, flavorants or odorants do not transfer to the food to a sufficient extent.

A smokeable film for packaging foods is described in EP-A 217 069. It comprises at least one layer which consists of a mixture of polyamide, an ethylene/vinyl alcohol copolymer (EVOH) and polyolefin, the constituents of the layer being in a defined weight ratio. The layer has a water vapor permeability of less than 40 $g/m^2 \cdot d$ at a temperature of 40° C. and a relative humidity of 90%. Under customary conditions, satisfactory smoke passage is thus not to be expected.

A water-vapor- and smoke-permeable food casing based on polyamide is also disclosed in WO 02/078455. The casing consists of a matrix of aliphatic polyamide or aliphatic copolyamide and a disperse phase of a low- or high-molecular weight hydrophilic component, such as polyvinylpyrrolidone, polyacrylamide.

SUMMARY OF THE INVENTION

The object was therefore to provide a ready-to-stuff shirred food casing made of a thermoplastic mixture in which the sausages or sausage links intended for smoking no longer need to be suspended in a smoke chamber and in which, during the ripening phase, no oil or fat escape is shown. The advantages of smoke- and water-vapor-permeable and also -impermeable polymer casings are to be combined and are thus to be suitable for producing raw, scalded-emulsion and cooked-meat sausages.

This object is achieved by a smoke- and water-vapor-permeable food casing made of a mixture based on polyamide or copolyamide which is impregnated with liquid smoke on the food-facing side. The casing is preferably a tubular casing, particularly preferably a seamless tubular casing.

DETAILED DESCRIPTION OF A PREFERRED EMBODIMENT

The casing (before the impregnation with the liquid smoke) consists of a mixture which comprises a) at least one aliphatic polyamide and/or aliphatic copolyamide (hereinafter termed aliphatic (co)polyamide) and also b) at least one thermoplastic other polymer or copolymer. Suitable polyamides or copolyamides are polycaprolactam (nylon 6), polyhexamethyleneadipamide (nylon 6,6), a polyblend or random copolyamide of nylon 6 and nylon 66 (nylon 6/6,6), nylon 11, nylon 12, polytetramethyleneadipamide (nylon 4,6), nylon 6,10, copolyamides of $\epsilon$-caprolactam and $\omega$-laurolactam (nylon 6,12), copolyamides of nylon 6 and nylon 12 (nylon 6/12). The (co)polyamide forms a coherent phase, i.e a matrix. The thermoplastic other (co)polymers then form the disperse phase.

Of the polyamides and copolyamides, those which are particularly suitable are those which can take up at least 3%, preferably at least 5%, of their weight of water. The fraction of the component a) is generally 40 to 90% by weight, preferably 45 to 80% by weight, particularly preferably 50 to 75% by weight, in each case based on the total weight of the mixture.

The thermoplastic further polymer or copolymer is preferably a heterofunctional polyamide, in particular a polyetheramide, polyesteramide, polyetheresteramide or polyamidourethane. The heterofunctional polyamides are generally block copolyamides which, in addition to (co)polyamide blocks, also have polyether blocks, polyester blocks and/or polyurethane blocks. The further (co)polymer can in addition be an $\alpha$-olefin/vinyl acetate copolymer (the $\alpha$-olefin is preferably ethylene, propylene or 1-butylene; a particularly preferred copolymer is an ethylene/vinyl acetate copolymer), a partially or completely saponified ethylene/vinyl acetate copolymer (ie it can also be an ethylene/vinyl alcohol copolymer having a corresponding degree of saponification), a partially or completely saponified poly-vinyl acetate, a polyesterurethane, a polyetherurethane, a polyester-etherurethane, a polyalkylene glycol, (in particular a poly(ethylene glycol), poly(propylene glycol) or a copolymer with polyethylene and/or polypropylene units and units of other monomers), a polyvinylpyrrolidone or a copolymer having vinylpyrrolidone units and units of other $\alpha,\beta$-olefinically unsaturated monomers, a (co)polymer having N-vinylalkylamide units (for example poly(N-vinylformamide) or poly(N-vinylacetamide) or a (co)polymer having units of $\alpha,\beta$-unsaturated carboxylic acids or $\alpha,\beta$-unsaturated carboxamides, in particular having units of (meth)acrylic acid and/or (meth)-acrylamide.

The component b) is particularly preferably a water-soluble organic polymer which swells under the action of water or water vapor. "Water-soluble" in the context of the present invention means polymers whose solubility in water of 80° C. is at least 20 g/l. Poly(vinyl alcohol) (PVAL) is included with these water-soluble polymers. Particularly preferred thereof is again a PVAL having a molecular weight Mw of 10.000 to 50.000 and a degree of saponification of 75 to 98%.

The fraction of the component b) is generally 10 to 60% by weight, preferably 20 to 55% by weight, particularly preferably 25 to 50% by weight, in each case based on the total weight of the thermoplastic mixture.

The mixture, in addition, can contain other organic or inorganic fillers. Suitable inorganic fillers are, for example, quartz powder, titanium dioxide, talcum, mica and other aluminosilicates, glass staple fibers and other mineral fibers and glass microspheres. Preferred organic fillers are polysaccharides, in particular starch, cellulose (in particular in the form of cellulose powder or short fibers), exo-polysaccharides (in particular Carrageenan, Locust bean gum or guar gum) and polysaccharide derivatives (such as crosslinked starch, starch esters, cellulose esters or ethers, or carboxyalkylcellulose ethers). The fraction of the filler is generally not greater than 40% by weight, preferably 1 to 25% by weight, particularly preferably 2 to 15% by weight, in each case based on the total weight of the thermoplastic mixture.

Finally, the mixture can further contain conventional additives, such as dyes or color pigments.

In a particular embodiment, the casing is multilayered. The internal layer, ie the layer which comes into contact with the food, has here the composition described. The further layers preferably consist of, generally aliphatic, polyamides (e.g. nylon 6), if appropriate blended with other correspondingly water-vapor-permeable polymers.

The food casing produced from the thermoplastic mixture can be a flat film or tubular film. It is generally single layered. Tubular films, in particular seamless tubular films, are preferred here.

The water vapor transmission rate (WVTR), determined as specified in DIN 53 122, of the inventive single layered or multilayered casing is generally at least 30 g/m²·d, preferably 60 to 500 g/m²·d, particularly preferably 80 to 300 g/m²·d, with air impinging the casing on a single side, which air has a temperature of 23° C. and relative humidity of 85%.

The inventive casing is preferably biaxially stretched and heat set. The heat setting is advantageously carried out in such a manner that a residual shrink remains. It causes the casing to lie firmly and free from folds on the stuffing material, or precisely even when the sausage has been scalded or boiled and then cooled again. The residual shrink is generally less than 20% in the longitudinal and transverse direction. In this case the change in length and width was determined on a sample after heating for 20 min in a water bath at 80° C.

Suitable smoke- and water-vapor-permeable casings, but without liquid smoke impregnation, and also methods for their production are disclosed in the older, applications, unpublished at the priority of the present application, DE 103 02 960 and DE 103 20 327.

The impregnation solution is finely distributed on the casing surface, so that, to a substantial part, it diffuses into the casing and during storage or ripening, can be uniformly released to the food situated in the casing. The impregnation is expediently performed by spraying the impregnation solution during shirring of the casing using a spraying mandrel. The solution is generally an aqueous solution, but it expediently also contains substances which decrease the surface tension and thus cause a particularly uniform flow of the sprayed-on solution. Suitable substances for this are, for example, polyols, such as ethylene glycol or propane-1,2-diol. They simultaneously lower the water activity (ie the $a_w$ value) and thus simultaneously act bactericidally or at least bacteriostatically, and fungicidally. A bactericidal and fungicidal action can also be achieved by para-hydroxybenzoic acid ($C_1$-$C_6$)alkyl esters and their salts. Those which may particularly be mentioned here are para-hydroxybenzoic acid methyl ester Na salt and para-hydroxybenzoic acid propyl ester Na salt and also mixtures thereof. The fraction of para-hydroxybenzoic acid alkyl ester(s) and/or their salts is generally about 0.5 to 2.5% by weight, preferably 0.8 to 2.0% by weight, in each case based on the total weight of the liquid smoke solution used for the impregnation.

The liquid smoke itself can be an acidic (in particular a natural) liquid smoke, a neutral liquid smoke, or a liquid smoke made alkaline. If appropriate, tar constituents are removed from it. An acidic liquid smoke is generally preferred, since it causes a particularly intensive and typical smoked flavor and an unadulterated smoked taste. If appropriate, the liquid smoke contains further additives, in particular viscosity-increasing substances (such as carboxymethylcellulose, CMC) and/or substances which influence the emulsion adhesion (such as lecithin, alginate or silicone oils).

A particularly suitable solution consists of commercially conventional smoke condensates, e.g. of 10 to 80% by weight ®Enviro 24 (from Red Arrow, Wis., USA), 10 to 30% by weight 1,2-propanediol and 0 to 80% by weight water. It is applied as spray solution via the internal mandrel spraying of a shirring machine. The solution serves simultaneously for presoaking the casing and for transfer of the smoke flavor. Thereafter, the casing is ready to use, without storage time/waiting time, directly after application at the shirring machine. The present invention accordingly also relates to an inventive casing which is in shirred form, i.e. as what is termed a shirred stick. For transport or storage, the shirred stick is expediently surrounded by a water-vapor-tight protective casing. In a particular embodiment, the casing is put into a curved shape before it is impregnated with the liquid smoke solution. Using such a curved casing, for example ring-shaped sausages may be produced.

Sausage links or the individual sausages can be placed directly in a collection vessel for drying and ripening. The inventive casing therefore offers the particular advantage that smoked color and smoked flavor can also be uniformly transferred when the sausages are not suspended, but are lying on a support. Suspension of the sausages or sausage links means an additional working step which can only be completed by hand. The sausage manufacturers are therefore endeavoring to avoid this working step.

The invention finally also relates to a method for producing a smoked food in a water-vapor- and smoke-permeable tubular casing. The method comprises the following steps:
providing a ready-to-stuff tubular casing,
stuffing the casing with a food, preferably sausage emulsion, in particular with raw sausage emulsion,
closing the casing, for example using a metal or plastic clip or by a yarn tie-off and
storing the stuffed casing.

The method comprises using a casing as claimed in the present invention impregnated on the interior side with liquid smoke. As a result the food can advantageously dry off and ripen in the casing. Smoked color, flavor and taste are simultaneously transferred to the food.

In the inventive method, smoking in a smoke chamber or an additional treatment with cold, warm or hot smoke is not required. If desired, however, it is possible in principle.

Using the inventive casing, not only can smoked sausages be produced, but also smoked cheese.

The examples hereinafter serve to illustrate the invention. Percentages herein are percentages by weight unless stated otherwise or it is clear from the context. "pbw" means "part(s) by weight". The color impression was determined by calorimetric measurements on the basis of the CIE-L*, a*, b* color space. The brightness and color values L*, a* and b* were determined as follows:
Measuring instrument: ChromaMeter CR 400 from Minolta Co., Ltd., Japan
Principle: Color space according to CIE (Commission Internationale d'Eclairage)
Standard applied: DIN 5033 Part 3
Illumination: D65 (standard light C with UV component corresponding to daylight)
Measurement principle: Spectral
Measurement geometry: 10° to the main reflection axis (="standard observer")

The term "water activity" ($=a_w$ value) corresponds to other names such as equilibrium moisture, water potential etc and is expressed as a ratio of the water vapor pressure present in a substrate (e.g. meat) to the maximum possible water vapor pressure at the same temperature. If a substrate is in hygroscopic equilibrium with the ambient air, the water activity can be related to the relative humidity, the water activity being $1/100$ of the relative humidity value. The $a_w$ value was determined in the examples hereinafter by a mechanical $a_w$ meter from Lufft GmbH, Fellbach-Schmieden).

pHs were determined using a WTW 537 measuring instrument and a ®Sentix Sp electrode (single-rod pH measuring chain for measurement of meat, fruit, cheese etc) from Wissenschaftlich-Technischen Werkstätten GmbH & Co. KG, D-82362 Weilheim.

EXAMPLE 1

Permeable Casing

A single layered, smoke- and water-vapor-permeable tubular polymer casing was produced using a single-screw extruder and a ring dye from a mixture of
68% nylon 6/12 (ratio 80:20 pbw) having a melt volume index (MVI) of 50 ml/10 min (measured at 275° C. under 5 kg load); ®Grilon CR9 HV from Ems-Chemie AG, Schweiz,
30% of a compound of 20 pbw of poly(ethylene glycol) having a mean degree of polymerization of 300 (®Genapol PEG 300), 10 pbw glycerol and 3 pbw of water and
2% of a masterbatch of calcium carbonate and nylon 6 (weight ratio 50:50 pbw; HT-MAB-PA9098 from Treffert).

The casing was biaxially stretched and heat set as described in DE 103 02 960. The casing thereafter had a wall thickness of 25 µm.

The casing was then shirred on a shirring machine, a solution of

30% water,

10% 1,2-propanediol and

60% liquid smoke being sprayed on via the shirring mandrel. The spraying rate was set using a rota meter at 15 l/h. The weight increase of the casing was about 25%. The casing was immediately thereafter stuffed with "Teewurst" emulsion, i.e. a raw sausage emulsion. Already during the stuffing process, the sausages were isolated and directly laid in a collecting vessel. After a waiting time of 48 hours under a controlled climate of 85 to 90% rh and 22° C., the pH of the sausage emulsion decreased from 5.8 to 4.8, the sausage reddened and the $a_w$ value decreased from 0.98 to 0.93. The sausage consistency had hardened. The sausage mix after a ripening time of 72 h was uniformly colored with a smoked color, and the smoked aroma was markedly perceptible.

EXAMPLE 2

Comparative Example: Water-Vapor-Impermeable Casing

A single layered smoke- and water-vapor-impermeable tubular biaxially stretched and heat set food casing produced from a mixture of 79.6% nylon 6, 10% copolyamide nylon 6I/6T, 10% ethylene/methacrylic acid copolymer and 0.4% mica (as described in Example 1 of EP 0 550 833), was shirred to form a shirred stick. The polymer casing which was not further presoaked was, as described in Example 1, impregnated with liquid smoke, it increasing by about 7% in weight. It was then stuffed as described with "Teewurst" emulsion. After a waiting time of 48 h, the pH of the emulsion decreased from 5.8 to 4.0, the sausage reddened, the $a_w$ value remained stable at 0.98. However, the sausage could not satisfactorily dry and ripen, so that the sausage did not have the desired consistency. Furthermore, the color transfer was much less, recognizable from the higher L* value.

EXAMPLE 3

Comparative Example: Cold Smoking

A casing according to Example 1 was sprayed only with water (i.e. not with liquid smoke) and increased in weight by about 25%. It was stuffed with "Teewurst" mix and then subjected, hanging, to a cold smoking method, thereafter stored for 48 h and smoked for a further 18 h. The pH of the sausage decreased from 5.8 to 4.5. The sausage reddened, and the $a_w$ value decreased from 0.98 to 0.92. The sausage had hardened in consistency.

Smoked color on the sausage surface was determined in comparison with the core of the sausage by L*, a*, b* measurement. Acid content and smoke intensity in comparison with a conventionally produced sausage were rated by sensory testing.

The result of the tests is shown in the table below:

| Example | L* value Surface | L* value Core | a* value Surface | a* value Core | b* value Surface | b* value Core | Taste |
|---|---|---|---|---|---|---|---|
| 1 | 50.3 | 65.7 | 21.5 | 13.1 | 32.5 | 17.5 | Very good, typical smoked taste |
| 2 | 62.6 | 66 | 14.2 | 12.6 | 21.2 | 15.8 | Unsatisfactory |
| 3 | 52.5 | 66.2 | 20.4 | 14.3 | 36.8 | 17.1 | Typical smoked taste |

The invention claimed is:

1. A smoke- and water-vapor-permeable food casing impregnated with liquid smoke on the food-facing side, wherein the casing is single-layered or multilayered, wherein the layer or at least one layer is made up of a mixture consisting essentially of a) at least one aliphatic polyamide and/or aliphatic copolyamide, b) at least one thermoplastic other polymer or copolymer, wherein the thermoplastic other polymer or copolymer is hydrophilic and has a solubility of at least 20 g/L in water at 80° C., c) at least one organic or inorganic filler, and d) at least one additive selected from a dye or a color pigment, wherein said mixture has a total weight, and wherein said at least one layer constitutes an internal layer of said multilayered casing.

2. The food casing of claim 1, wherein said food casing is tubular.

3. The food casing as claimed in claim 1, wherein the polyamide or copolyamide a) is polycaprolactam (nylon 6), polyhexamethyleneadipamide (nylon 6,6), or polyblend or random copolyamide of nylon 6 and nylon 66 (nylon 6/6,6), nylon 11, nylon 12, polytetramethyleneadipamide (nylon 4,6), nylon 6,10, a copolyamide of ε-caprolactam and ω-laurolactam (nylon 6,12), a copolyamide of nylon 6 or a nylon 12 (nylon 6/12).

4. The food casing as claimed in claim 1, wherein the polyamide or copolyamide a) forms therein a coherent phase.

5. The food casing as claimed in claim 1, wherein component a) is present in a fraction of 40 to 90% by weight, based on the total weight of the mixture.

6. The food casing as claimed in claim 1, wherein component b) is a water-soluble organic polymer, wherein said water-soluble organic polymer is one which swells under action of water or water vapor.

7. The food casing as claimed in claim 1, wherein component b) is present in a fraction of 10 to 60% by weight, based on the total weight of the mixture.

8. The food casing as claimed in claim 1, wherein the inorganic filler comprises quartz powder, titanium dioxide, talcum, mica and other aluminosilicates, glass staple fibers and other mineral fibers and/or glass microspheres.

9. The food casing as claimed in claim 1, wherein the organic filler is a polysaccharide.

10. The food casing as claimed in claim 1, wherein component c) is present in a fraction greater than zero but not greater than 40% by weight, based on the total weight of the mixture.

11. The food casing as claimed in claim 1, having a water vapor transmission rate (WVTR), wherein said WVTR, determined as specified in DIN 53 122, with air impinging the casing on a single side at 23° C. and at a relative humidity of 85%, 80 to 500 g/m²d.

12. The food casing as claimed in claim 1, wherein said food casing is multilayered.

13. The food casing as claimed in claim 1, wherein said food casing is biaxially stretched and heat set.

14. The food casing as claimed in claim 1, wherein the liquid smoke is an acidic liquid smoke.

15. The food casing as claimed in claim 1, wherein said food casing is in shirred form.

16. The food casing as claimed in claim 1, wherein the food casing contains a smoked sausage product or smoked cheese.

17. The food casing as claimed in claim 2, wherein said food casing is seamless.

18. The food casing as claimed in claim 9, wherein the polysaccharide is starch, cellulose, exo-polysaccharides, a polysaccharide derivative, crosslinked starch, starch ester, cellulose ester, cellulose ether, or carboxyalkylcellulose ether.

19. A method for producing a smoked food in a water-vapor- and smoke-permeable tubular casing having the steps
providing a ready-to-stuff tubular casing based on polyamide,
stuffing the casing with a food,
closing the casing and
storing the stuffed casing,
which comprises the polyamide-based casing being a casing as claimed in claim 1.

20. The method of claim 19 wherein the food is sausage emulsion or raw sausage emulsion.

21. A smoke- and water-vapor-permeable food casing impregnated with liquid smoke on the food-facing side, wherein the casing is single-layered or multilayered, wherein the layer or at least one layer is made up of a mixture consisting essentially of a) at least one aliphatic polyamide and/or aliphatic copolyamide, b) at least one thermoplastic other polymer or copolymer, wherein the thermoplastic other polymer or copolymer is hydrophilic and has a solubility of at least 20 g/L in water at 80° C., c) at least one organic or inorganic filler, and d) at least one additive selected from a dye or a color pigment, wherein said mixture has a total weight, and wherein said casing is multilayered the at least one layer constitutes an internal layer, further having a water vapor transmission rate (WVTR), wherein said WVTR, determined as specified in DIN 53 122, with air impinging the casing on a single side at 23° C. and at a relative humidity of 85%, is 80 to 500 g/m²d.

* * * * *